July 13, 1943. N. R. KRAUSE 2,324,261
PICK-UP DEVICE
Filed July 17, 1939 3 Sheets-Sheet 2
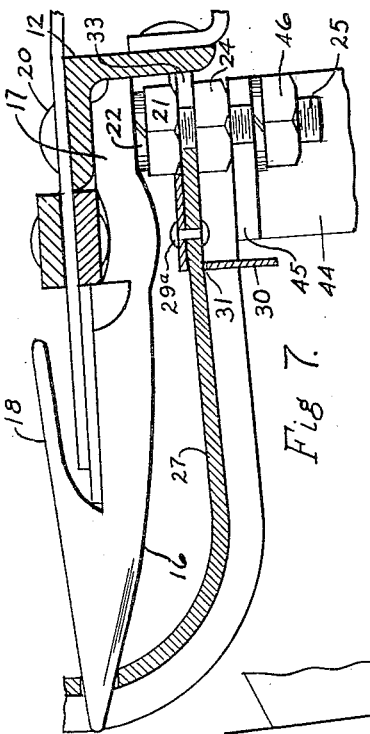
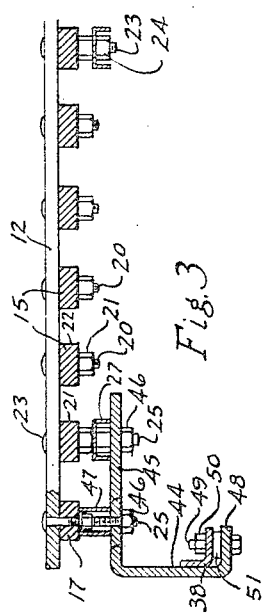
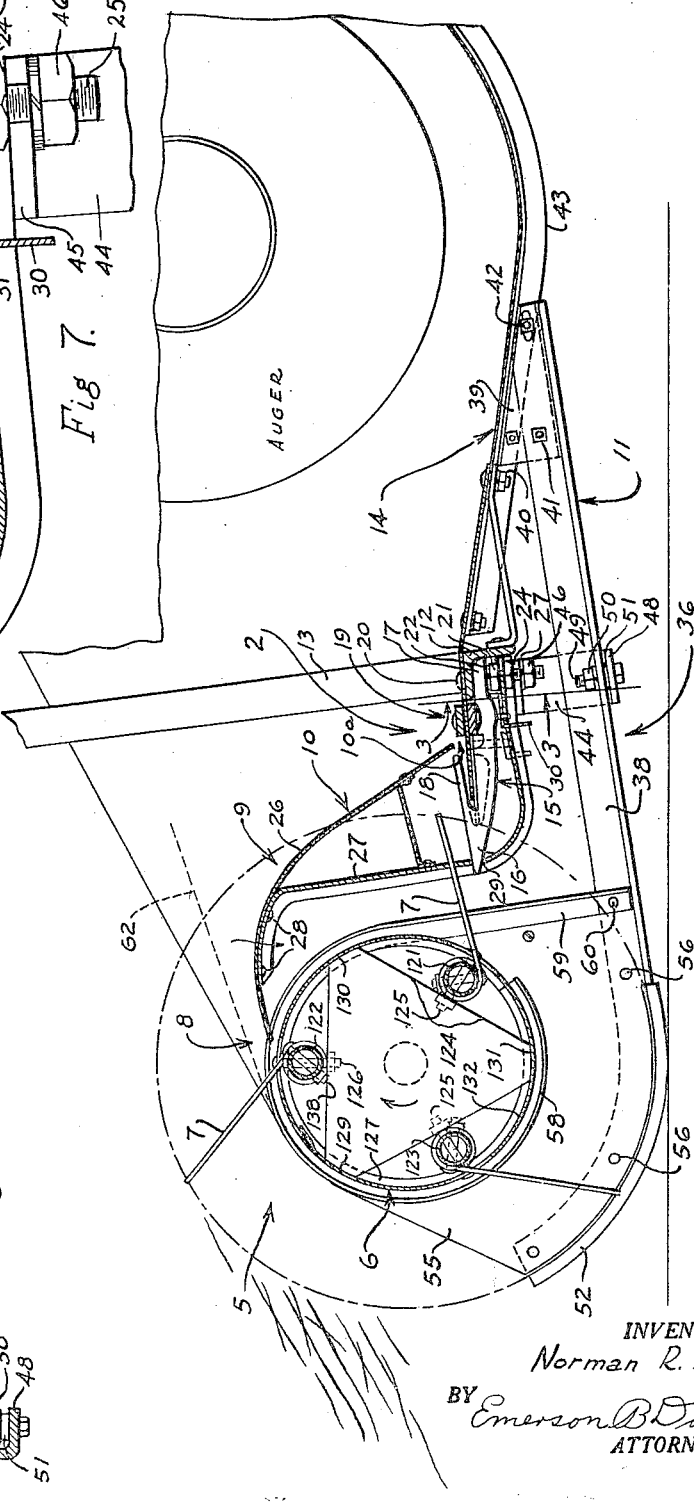
INVENTOR.
Norman R. Krause
BY Emerson B Donnell
ATTORNEY

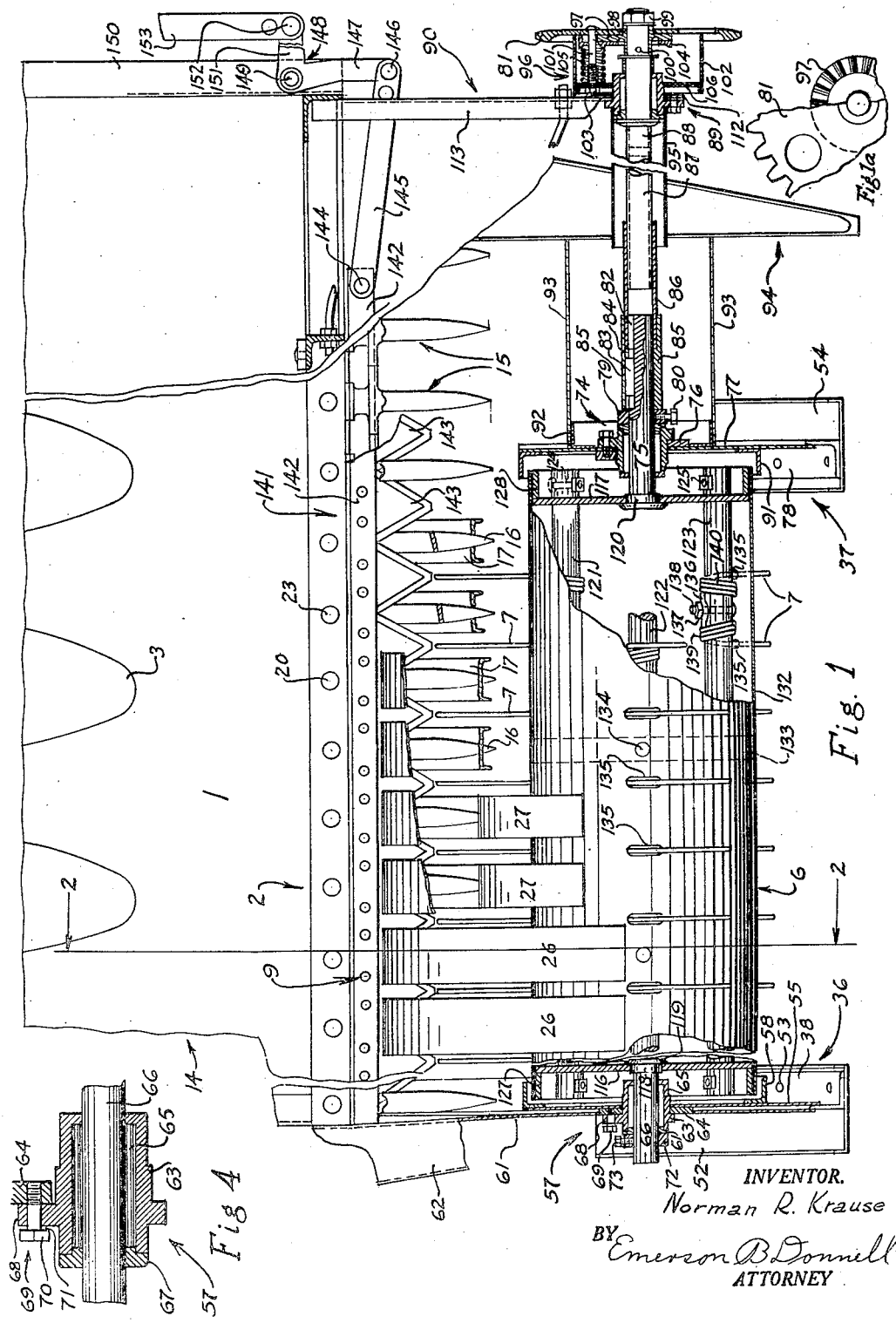

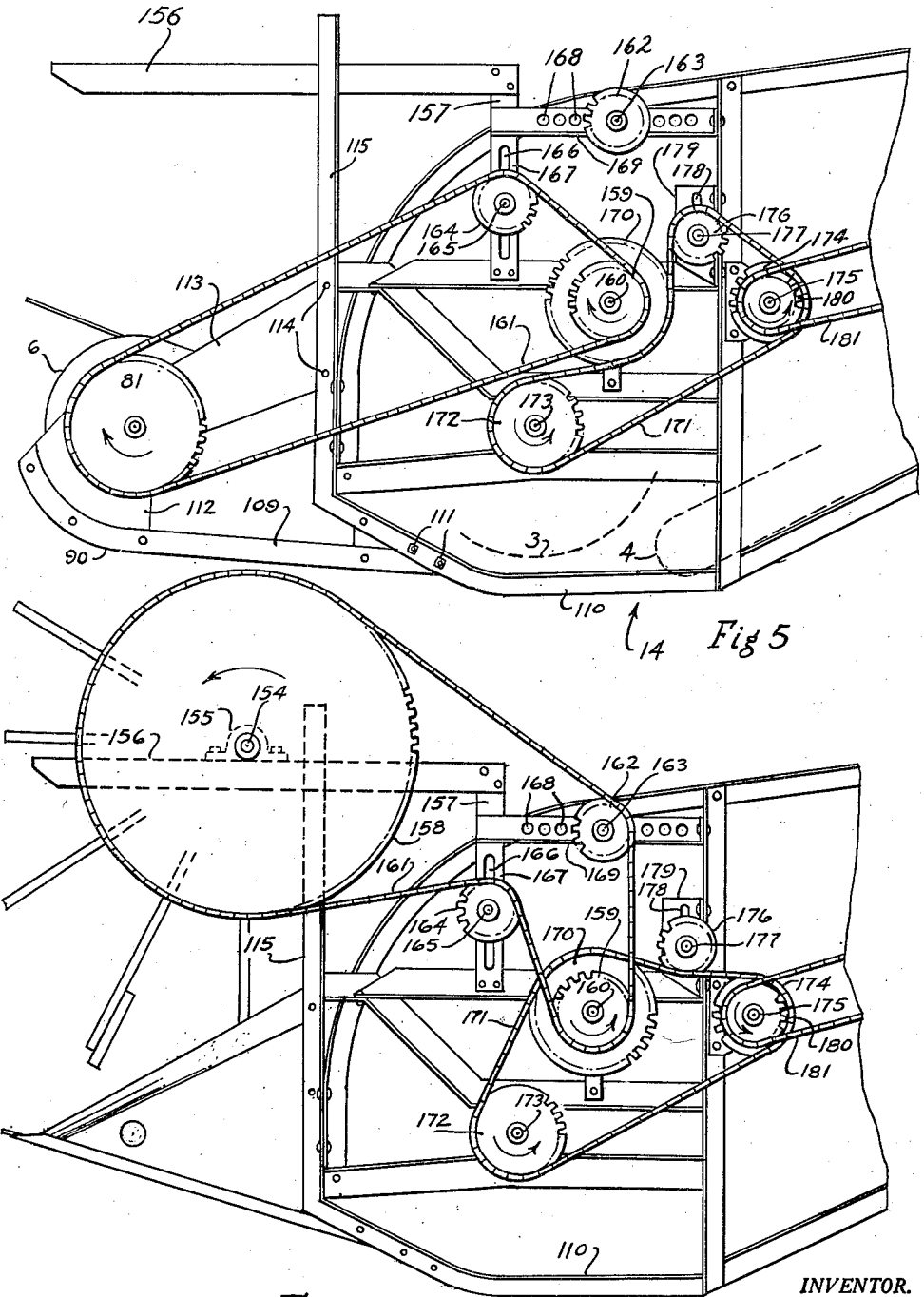

Patented July 13, 1943

2,324,261

UNITED STATES PATENT OFFICE 2,324,261

PICKUP DEVICE

Norman R. Krause, Racine, Wis., assignor to J. I. Case Company, Racine, Wis., a corporation Application July 17, 1939, Serial No. 284,832

14 Claims. (Cl. 56—364)

The present invention relates to pick-ups and an object of the invention is to generally improve the construction and operation of devices of this class. More particularly an object of the invention is to provide an improved pick-up which is applicable to a sickle mechanism such for example as that of a combination harvester thresher.

A further object is to provide such a mechanism which may be attached to the cutter bar of such a machine without removing any of the guards or the sickle.

A further object is to simplify the construction of such apparatus and materially reduce the weight thereof.

A further object is to utilize the sickle to assist in clearing the pick-up.

A further object is to provide an improved type of guard for the pick-up so shaped as to be cleared by the pick-up fingers, and further objects are to provide improved means for attaching a pick-up to a sickle mechanism; means for driving the pick-up in the correct direction; improved construction of a pick-up cylinder and other objects and advantages which will be apparent from the following specification and accompanying drawings in which:

Figure 1 is a plan view of the device in place on a harvester platform with parts broken away to show interior construction.

Fig. 2 is a vertical sectional view taken on the line 2—2 of Fig. 1.

Fig. 3 is a vertical sectional view taken on the line 3—3 of Fig. 2.

Fig. 4 is an enlarged detail view of certain mechanism indicated in Fig. 1.

Fig. 5 is an end elevation of a portion of the harvester with the pick-up in place showing the driving means arranged for actuating the latter.

Fig. 6 is a similar view showing the same driving means arranged for driving the reel of the harvester when the pick-up is removed.

Fig. 7 is an enlarged detail view of certain mechanism indicated in Fig. 2.

As seen in Fig. 1 the device is shown as applied to a "combine" although it is equally applicable to a binder or other similar mechanism in which the crop is to be deposited on a conveyor or the like. The present machine has a header mechanism generally designated as 1 including a cutter bar generally designated as 2 and an auger 3 for collecting the cut material and conveying it to a raddle or other suitable conveyor 4 (Fig. 5) by which it is transmitted to the threshing mechanism, which is not shown since it forms no part of the present invention. Other conveying mechanism is contemplated as equivalent.

The pick-up mechanism is generally designated as 5 and comprises, as more particularly shown in Fig. 2, a rotary cylinder generally designated as 6 having a plurality of pick-up fingers 7—7 projecting from the cylinder and in the present instance inclined backwardly with relation to the direction of rotation of the cylinder, although other positions of the fingers may be desirable under certain conditions, and the invention is not to be taken as limited to such inclination of the fingers, or in fact in any manner except as defined by the claims.

Cylinder 6 is rotated in a clockwise direction as seen in Fig. 2 as the machine carrying the pick-up is advanced to the left, material in a windrow being raised by the fingers and carried over the cylinder as suggested. At about point 8 any material in contact with the cylinder encounters a slotted stripper plate generally designated as 9, but actually comprising a series of small plates as will appear, which is so curved as to define with the fingers substantially or somewhat more than a right angle on the advancing side of the fingers at all points during the passage of the fingers through the plate, the latter approaching the cylinder closely at point 8 and gradually receding therefrom in the direction of movement of the fingers so that the fingers disappear beneath the plate at about the point 10.

This disposition of the plate gently urges material along the length of the fingers toward and off the ends thereof without any tendency toward catching or pinching material between the plate and fingers due to the movement of the fingers.

Stripper plate 9 terminates substantially directly above and so as to define a lower terminal clearance space 10ª above cutter bar 2 so that any material which may be crowded downwardly by the teeth past the point 10 will escape from the slots in to the space above, and encounter the cutter mechanism and be reduced to relatively short lengths which will drop harmlessly to the ground. It should be understood that this function of the apparatus is in the nature of an emergency expedient, and that no significant amount of material passes through the cutter in this way.

The utility of this function becomes apparent when a long weed or vine or the like happens to follow one of the fingers downwardly through one of the slots in plate 9. When in prior constructions such a weed would normally wind itself about the cylinder and eventually clog the machine, in the present instance it would be cut up and discharged harmlessly to the ground.

Returning to a consideration of the structural details of the illustrative embodiment, cutter bar 2 comprises an angle iron 12 fixed with a frame element 13 forming a part of the auger trough generally designated as 14 and carrying a series of points or guards 15—15 (see also Fig. 1). Each guard includes a point portion 16, a shank portion 17 and a guide portion 18 extending backwardly over the sickle or cutting element generally designated as 19. Guards 15 are fixed with angle iron or bar 12 as by bolts 20—20, Fig. 3, each bolt having a nut 21 for clamping the guard forcibly against angle iron 12, a lockwasher 22 or the like being interposed if desired.

At intervals along the length of bar 12 a guard 15 is provided with a longer bolt 23, Fig. 3, for assisting in readily attaching the pick-up assembly by nuts 24, still longer bolts 25—25 being used at the ends of the cutter bar for further supporting the pick-up unit.

Considering first the stripper plate 9, this unit comprises a plurality of relatively narrow plates 26—26 suitably curved and supported from beneath on brackets 27—27 in the present instance composed of channel section material, fixed with plates 26 as by rivets or the like 28—28 and extending downwardly and then curved backwardly to be attached beneath the cutter bar. Brackets 27 have openings 29 through which above mentioned points 16 of guards 15 extend, the weight of the plates and brackets being thus carried largely on the sickle guards. Most of brackets 27 after turning rearwardly are fixed as by welding, a rivet 29ª, Fig. 7, or the like, with an angle iron 30 extending substantially the length of the cutter bar beneath the guards 15, all the brackets extending through apertures as 31 in the angle iron.

At suitable intervals across the cutter bar one of the brackets 27 is made to extend further rearwardly than the rest and has a slot 33 in which bolts 23 are disposed when bracket 27 is applied to the cutter bar. When the parts are placed in position above mentioned nut 24 is screwed up against the underside of bracket 27 and clamps the bracket into forcible contact with above mentioned nut 21, a suitable lockwasher or the like being interposed if desired. Through the interconnection of the brackets by means of angle iron 30 all of the brackets are positively held in place on the points 16 by the action of nuts 24. Loosening of the several nuts 24 will accordingly permit removal as a unit of stripper plate 9.

Pickup drum 6 is carried, as will appear presently, in brackets generally designated as 36 and 37 constituting part of above mentioned supporting frame 11. Bracket 36 includes an angle iron 38 connected as by a fish-plate 39 and bolts 40, 41 and 42 with an angle iron 43 forming part of above mentioned auger trough 14. Angle iron 38 is further supported by a bracket 44, Fig. 3, having an upper attaching portion 45 through suitable apertures of which extend above mentioned long bolts 25, nuts 46—46 clamping portion 45 securely against one of bracket portions 27 and a spool 47 or the like interposed between portion 45 and one of shank portions 17. Bracket 44 also has a portion 48 extending beneath angle iron 38 and fixed thereto as by bolt 49 and nut 50, washers 51 being interposed if desired to obtain an adjustment of the position of angle iron 38. A similar construction is utilized in connection with bracket 37 and need not be further described.

Bracket 36 has a shoe element 52 fixed in any suitable manner as by rivets 53, Fig. 1, with the forward portion thereof both the angle iron and the shoe curving upwardly as shown to permit easy sliding movement over the ground, although it is contemplated that shoe 52 may be omitted and bracket 36 proportioned so as to clear the ground if desired, the pick-up, due to its light weight being readily supported entirely from the header. A similar shoe 54 is carried in the same manner by above mentioned bracket 37, but this may also be omitted within the contemplation of the invention.

For carrying cylinder 6 a plate 55 is fixed with angle iron 38 as by rivets 56—56, Fig. 2, and extends upwardly to carry a bearing generally designated as 57, Fig. 1, the plate being reinforced in the present instance by means of an angle iron 58 of circular formation surrounding the end of the cylinder and having a depending portion 59 fastened to above mentioned angle iron 38 as by a rivet 60.

A shielding plate 61 is suitably fixed as by welding, riveting or the like with the outside of angle iron 38 or otherwise supported from auger trough 14, and has a rolled or bent portion 62 above drum 6 forming a finished upper edge for bracket 36 and serving to deflect any stray material either toward the drum or away from other working parts of the machine.

Bearing 57, as more particularly shown in Fig. 4, comprises an outer shell 63 carried in a reinforcing plate 64 fixed in any suitable manner, as for example by welding, with above mentioned plate 55, a series of rollers 65 within shell 63 serving to support for rotation a stub shaft 66 forming a part of drum 6. A cap 67 closes the outer end of shell 63 to prevent the escape of rollers 65 or the entrance of foreign material. Shell 63 includes a plurality of ears 68 having suitable openings for studs, cap screws or the like 69 fixed with reinforcing plate 64 for holding shell 63 in place in plate 64.

Cap screw 69 has a head 70 which is spaced slightly from ears 68 as indicated at 71 whereby to provide for a certain amount of "floating" or freedom for movement of shell 63. Other suitable or well-known expedients may be utilized for this purpose within the contemplation of the invention. It is understood that there will be several ears such as 68 to prevent material displacement of the bearing.

To prevent end play in the cylinder 6 a collar of suitable or well-known form 72, Fig. 1, is fixed on stub shaft 66 as by a set screw 73, and bears against above mentioned cap 67.

A bearing generally designated as 74 supports the other end of cylinder 6, engaging a stub shaft 75, carried in a plate 76, supported from a plate 77 similar to above mentioned plate 55 and connected to an angle iron 78 forming a part of above mentioned bracket 37. A collar 79 fixed with stub shaft 75 as by a set screw 80 bears against bearing 74 and prevents end play in cylinder 6 in the opposite direction from collar 72. Shifting of these collars provides an endwise adjustment of cylinder 6 to properly locate fingers 7 in relation to the slots in stripper plate 9. The construction of bearing 74 is substantially identical with that of bearing 57 and need not be further described.

Shaft 75 is connected with a sprocket 81 through which it and cylinder 6 are driven. For this purpose shaft 75 has a keyway 82 in which is seated a key 83 also engaging a keyway 84 in a sleeve 85 which may be loosely engaged with the shaft. Sleeve 85 is fixed in a suitable manner, as for example by welding, with a sleeve 86 which in turn is fixed for example in similar manner with a hollow shaft 87 extending to and welded or otherwise suitably fixed to a shaft portion 88 engaged in a bearing generally designated as 89 and carrying above mentioned sprocket 81. Bearing 89 is carried by a bracket generally designated as 90 and may be mounted in a manner similar to above-mentioned bearings 57 and 74 and need not be further described.

The whole structure of devices of this class being very flexible, the floating provided by the relatively loose mounting of the bearings and the connection accorded by the loose fit of sleeve 85 on shaft 75 prevents binding in any of the working parts due to flexing of the supporting means.

An angle iron 91 is shaped to encircle the opposite end of cylinder 6 from angle iron 58 and for a similar purpose. A flange 92 supports a shielding plate or housing 93 encircling sleeve 85 and its associated parts to prevent catching of straw and the like on the rotating elements. Shield 93 extends between plate 77 and a divider or the like generally designated as 94, shaft 87 passing through the divider and being enclosed in a tubular housing 95 extending to bearing 89.

Sprocket 81 includes an overload release or "jump clutch" generally designated as 96, serving to permit the sprocket to continue to rotate in the event that drum 6 becomes entangled or is otherwise prevented from rotating.

Jump clutch 96 includes a pressure plate 97 fixed with shaft 88 as by a hub 98 and a nut 99 a pin or the like 100 passing through the hub and shaft if desired. Sprocket 81 is rotatably mounted on hub 98 and pressed against plate 97 by a plurality of bolts as 101, passing through the sprocket and a housing 102 and having nuts as 103 outside the housing. Within housing 102 is located a pressure plate 104 urged against plate 97 by a plurality of springs as 105 disposed for convenience about bolts 101 and compressed between the end portion 106 of housing 102 and pressure plate 104. The length of these springs is so chosen that the degree of compression thereof is substantially correct, upon assembly of the parts, when housing 102 has been forced by nuts 103 into contact with sprocket 81. The load at which the jump clutch will yield is therefore predetermined by the proportions of the parts and misadjustment is impossible.

A pressure plate 104 is connected as by interengaging lugs 107 and 108 with sprocket 81, above mentioned plate 97 being small enough so that the sprocket and pressure plate 104, together with bolts 101, may rotate about plate 97. Lugs 107 and 108 permit relative axial movement of pressure plate 104 and plate 97 without disengagement of plate 104 from sprocket 81. Plate 97 and pressure plate 104 or sprocket 81 if preferred, may have interengaging serrations or be otherwise arranged to engage each other yieldingly due to the pressure of springs 105, the whole providing a positive driving connection to shaft 88 except in the event that an overload is applied to the sprocket.

Other suitable or well-known types of overload protecting devices may be substituted at this point within the contemplation of the invention.

Bracket 90 comprises an angle iron 109 (see also Fig. 5) fixed with a portion 110 of auger trough 14 as by bolts or the like 111 and has a plate 112 extending upwardly and carrying above mentioned bearing 89, an angle iron, brace or the like 113 connecting with plate 112 to assist in supporting the bearing. Brace 113 is connected as by bolts 114 with a vertical element 115 connected with auger trough 14 and serving in part as a support for a reel as will appear.

Drum 6, as particularly shown in Figs. 1 and 2 comprises a cage-like frame having end plates 116 and 117 welded or otherwise suitably fixed with stub shafts 66 and 75, shaft 66 in the present instance having an upset portion 118 on which plate 116 is fastened, and a head portion 119 for assisting in preventing displacement of the plate. Shaft 75 is similarly formed having an upset portion 120 engaged with plate 117.

Plates 116 and 117 are connected by tubular or other suitable elements 121, 122 and 123 fixed for example by bolts 124, 125 and 126 with reinforcing rings 127 and 128 welded or otherwise suitably fixed respectively with plates 116 and 117 as for example at 129, 130 and 131.

Other specific arrangements for fastening the elements 121, etc., to plates 116 and 117 are contemplated as equivalent.

Rings 127 and 128 are enclosed by a cylindrical housing or casing 132, one or more additional reinforcing rings as 133 being interposed if desired and preferably although not necessarily anchored to elements 122, etc., as by bolts 134. Slots 135—135 are provided in the surface of casing 132 through which above mentioned fingers 7 extend, the fingers being anchored in any suitable manner to elements 123 etc.

Fingers 7 as seen in Fig. 1 are formed in pairs, a single piece of resilient rod, wire 136 or the like being engaged beneath nut 137 on a bolt or the like 138 in element 123. Wire 136 extends in both directions axially of element 123 and is coiled, preferably although not necessarily about the element at 139 and also at 140. Coils 139 and 140 terminate in straight portions extending through slots 135—135 and constituting above mentioned fingers 7—7.

Yielding of the fingers is thus regularly provided for by flexing of the coils 139 and 140, and slots 135 are made long enough so that fingers 7 may have freedom of movement in either direction peripherally of drum 6. In this manner impacts of the fingers with the ends of the slots, upon release of the fingers from material being picked up, is prevented, which avoids shock loads and fatigue in the metal of the fingers.

The numerous pairs of fingers being alike, it will be unnecessary to describe more than one.

Cutter bar 2 includes a sickle 141 comprising a bar 142 carrying a plurality of cutter portions 143—143 arranged to cooperate in suitable or well-known manner with above mentioned sickle guards 15. Bar 141 is connected as by a suitable pivot 144 with a link 145, the link being pivoted as by a pin or the like 146 to the arm 147 of a bell crank 148. Bell crank 148 is pivoted on a stud or the like 149 fixed with a frame portion 150 constituting part of auger trough 14 and it has an arm 151 pivoted as by a pin 152 to a pitman 153 actuated in suitable or well-known manner not shown.

The drive for drum 6 may be effected in any suitable manner, but in the present instance, inasmuch as the reel normally on the harvester portion of the combine is not used while the pick-up is in operation, this drive is taken from the mechanism already on the combine for driving the reel. Thus, as seen in Fig. 6, a reel shaft 154, when the reel is in use, is supported in suitable bearings as 155 from forwardly extending arms or members as 156 carried by above mentioned member 115 and an element 157 forming part of auger trough 14.

Shaft 154 carries a relatively large sprocket, pulley, wheel or the like 158 driven from an idler 159 journaled on a stud or the like 160 carried by a portion of the auger trough through a chain or flexible element 161, element 161 passing over and being in part supported by an idler 162 journaled on a stud 163 suitably supported from the auger trough. Element 161 also passes over an idler or tightener 164 journaled on a stud 165 movable in a slot 166 of a member 167 constituting part of the auger trough. Stud 165 may be clamped in slot 166 in order to obtain the correct tensioning or adjustment of flexible element 161, or it may be resiliently urged in a tightening direction to automatically maintain the tension in the chain within the contemplation of the invention. Large adjustments in member 161, as for example to provide for changes in position of shaft 154 may be accommodated by clamping stud 163 in any one of a series of holes 168—168 in a member 169 constituting part of the auger trough.

Idler 159 is driven from an idler 170 through a flexible element 171 engaging a sprocket or the like 172 carried on a shaft 173 which may conveniently be the auger shaft or axis. Element 171 is also engaged with a sprocket or the like 174 on a shaft 175 journaled in auger trough 14, and an idler or tightener 176 journaled on a stud 177 engaged in a slot 178 in an element 179 also forming part of auger trough 14. Stud 177 may be arranged to be clamped in various locations in slot 178 of a member 179 forming part of auger trough 14 for properly tensioning flexible element 171.

Shaft 175 also has a sprocket or the like 180 engaged by a chain or other flexible element 181 actuated in any suitable manner not shown from some operative part of the machine. Actuation of sprocket 180 drives shaft 175, sprocket 174, element 171, idlers 170 and 159, and through element 161, sprocket 158 and reel shaft 154, the directions of rotation being as indicated.

Drum 6, as seen in Fig. 5, must rotate in the opposite direction to that of reel shaft 154, and to accomplish this the same sprockets and flexible elements are suitably and readily rearranged. Thus flexible element 171 is arranged to pass under instead of over sprocket 170, and over instead of under tightener 176, thus effecting the opposite rotation from that indicated in Fig. 6. Sprocket 159 actuates the same chain or flexible element 161 which passes only over tightener 164, and about above mentioned sprocket 81. It will be noted that this results in opposite rotation of sprocket 81 from that of above mentioned sprocket 158.

The operation of the device is thought to be clear from the above description. Sufficient to say, when it is desired to pick up material from a windrow, or otherwise, with a combination harvester thresher, the header portion of the thresher is ordinarily (although not necessarily) shortened by removing the outer section or sections and leaving the structure designated as 1 in Fig. 1. The pickup attachment is then applied by fitting brackets 27 over the points of guards 15 and clamping certain of the brackets to bolts 23 by nuts (24). Reel shaft 154, Fig. 6, is removed and drum 6, Fig. 1, is applied by fastening brackets 36 and 37 in place as above described. Flexible element 171 is then removed from its position running over idler 170 and re- arranged to pass under idler 170 and over idler 176. Flexible element 161 is then applied to member 159 so as to pass over idler 164 and about driving wheel 81 as shown in Fig. 5. Rotation of auger shaft 173 then results in clockwise rotation of drum 6, which, of course, is opposite to the desired rotation of reel shaft 155 under ordinary conditions.

Sickle 141 is not disturbed and continues to operate as above described to assist in clearing the drum in the event that any lengthy material tends to wind about it.

The fingers 7 pick up the material and raise it over the drum but are effectively stripped without any tendency toward packing due to the continuous large angle between the fingers 7 and the stripper plates 26.

The fingers retire between plates 26 quite promptly after the plates encounter the incoming material so that the material is not retarded in its passage in the direction urged by the auger by reason of continuing engagement of the fingers. The clearance between the lower edges of stripper plates 26 and wheel 141 assists in avoiding clogging since it renders it impossible for any material to wrap about the stripper plates or lodge in the slots between the plates, following material tending to urge such wrapping material into the said clearance or to force such packed material out of the slots and into the clearance where it will be immediately attacked and disintegrated by the sickle or passed on to the auger.

Fingers 7 are free to vibrate within slots 135 to avoid any tendency toward breaking them against the extremities of the slots. Flexibility and freedom of all the parts are provided by the floating engagement of bearings 57, 74 and 89 in the respective brackets 36, 37 and 90. Flexibility in the drive is provided by the loose joint at 82.

Clogging of the pickup cylinder is extremely unlikely, but in the event that an obstruction to the rotation of drum 6 is encountered, drive wheel 81 may continue to rotate without damage to the parts owing to the slipping of jump clutch 96.

The whole construction is materially lighter, simpler, and less subject to clogging and other difficulties than prior pick-up constructions.

The above being a complete description of an illustrative embodiment of the invention, what is claimed as new and desired to be secured by Letters Patent of the United States is:

1. In a combination harvester-thresher the combination of a header, a sickle structure having a moving cutting element, a pick-up unit, and means for attaching the pick-up unit to the header, said means being adapted to support the pick-up in position to cooperate with the sickle, the parts being arranged to so locate the pick-up near enough to the sickle so that material caught on the pick-up and tending to wind thereon will be carried into and cut by the sickle for clearing the pick-up.

2. In a combination harvester-thresher a header including a sickle and a plurality of guard fingers, a pick-up device including a frame, a plurality of supports attached to said frame and having openings therein engageable when said supports are moved rearwardly with guard fingers of said header for supporting the pick-up, and means on said frame attached to said header at a point rearwardly of and below said supports and adapted for preventing forward displacement of said supports from said fingers and for further supporting the pick-up.

3. In a pick-up for a combination harvester-thresher a drum including a plurality of elements forming a cage including longitudinal elements fixed with the cage against rotation except with the cage, a plurality of spring fingers carried by the elements, and a cylindrical casing fixed with and enclosing the cage and having slots through which the fingers project for contacting the material to be picked up.

4. In a pick-up a drum including a plurality of longitudinal elements fixed with the drum against rotation and forming a cage, a plurality of spring fingers carried by the elements, a cylindrical casing fixed with and enclosing the cage and having slots through which the fingers project, said slots being of greater length than the springing movement of the fingers under the influence of the material being picked up.

5. In a pick-up a drum comprising a driving shaft, a spacer element on the shaft, a plurality of longitudinal elements fixed with the spacer against rotation except with said spacer and arranged to define the elements of a cylinder, a second spacer fixed with the longitudinal elements, a casing fixed with the spacers and a shaft fixed in the second spacer and forming a continuation of the driving shaft.

6. In a pick-up for a combination harvester-thresher a drum including a plurality of rows of pick-up fingers and arranged to be mounted on a header having a sickle and guard fingers, and a plurality of stripper plates supported between said rows of pick-up fingers in position to cover the guard fingers, said stripper plates being spaced to provide slots for the passage of the fingers and said plates leading toward said sickle so as to direct said slots toward the sickle so that material carried by the fingers and tending to wind thereon will be carried thereby into the sickle.

7. In a pick-up for a combine having a header including a sickle and a plurality of sickle guards, a pick-up including a stripper plate assembly comprising a portion engaged with and supported on said guards, and a portion extending beneath said guards and engaged with said header at points spaced from said guards for assisting in so supporting said stripper plate.

8. In a pick-up for a combine having a header including a sickle, a drum including a plurality of rows of pick-up fingers and mounted on the header, a plurality of stripper plates supported between the rows of pick-up fingers and constituted to define a lower terminal clearance space adjacent said sickle, said plates defining therebetween slots for the passage of the fingers and which slots open into said terminal clearance space and are directed substantially toward said sickle so that material catching in said slots will be caused by said fingers to traverse said slots and terminate clear of said slots in said terminal clearance space and in position to be cut by said sickle.

9. In a combine having a header including a sickle and a plurality of guards, a pick-up including a stripper plate having a portion engaged with said guards, for supporting said stripper plate.

10. In a pick-up for fibrous material, the combination of a header, an auger supported at the rearward portion of the header and adapted to receive material along the length thereof and to convey it in the direction of its length, a pick-up associated with the header and extending lengthwise thereof, said pick-up including a drum having pick-up fingers extending outwardly therefrom for engaging said fibrous material and propelling it over the drum and onto said header upon rotation of said drum, and means for separating said material from said fingers at the forward portion of said header whereby to be spaced substantially from the point of engagement of said auger with said material, so that said material may clear said fingers before changing its direction from the rearward movement caused by the fingers to the transverse movement caused by said auger.

11. In a pickup the combination of a rotatable drum, a plurality of spaced pick-up fingers extending from the drum and secured thereto so as to maintain a substantially fixed position relatively to the drum during rotation thereof, and a stationary slotted stripper plate extending from a region adjacent the drum in a curve of gradually increasing radius away from the drum, the slots in said plate being disposed for the passage of said fingers and said curve being so chosen as to define with said fingers, an angle larger than an acute angle on the advancing side of the fingers at substantially all points during the passage of the fingers through said plate.

12. In a harvester thresher the combination of a header, a sickle structure on the header, a pick-up unit attached to the header in advance of the sickle and having a plurality of pick-up teeth adapted to revolve about an axis in advance of the sickle, said unit being supported in a position such that said revolvable teeth pass in close proximity to the moving sickle whereby material caught on the pick-up and tending to wind thereon will be carried into and cut by the sickle for clearing the pick-up.

13. In a pick-up for a harvester having a sickle, the combination of a rotatable drum supported on the harvester, a plurality of spaced pick-up fingers extending outwardly from the drum and inclined backwardly relatively to the direction of rotation of the drum, said fingers being secured to the drum so as to maintain a substantially fixed position relatively thereto during rotation thereof, and a stationary slotted stripper plate supported from the harvester and extending from a region adjacent the drum in a gradually decreasing curve away from the drum and toward the sickle, the slots in said plate being positioned for the passage of said fingers during rotation of the drum, and the curvature of said stripper plate decreasing at a rate sufficiently gradual so that the angle on the advancing side of the fingers is larger than an acute angle at substantially all points during the passage of the fingers through said plate.

14. In a pick-up for a harvester having a sickle, the combination of a rotatable drum supported on the harvester, a plurality of spaced pick-up fingers extending outwardly from the drum, said fingers being secured to the drum so as to maintain a substantially fixed position relatively thereto during rotation thereof, and a slotted stripper plate supported from the harvester and extending from a region adjacent the drum away from the drum and toward the sickle, the slots in said plate being positioned for the passage of said fingers during rotation of the drum.

NORMAN R. KRAUSE.